(12) United States Patent
Taneja et al.

(10) Patent No.: US 12,452,049 B2
(45) Date of Patent: Oct. 21, 2025

(54) SYSTEM AND METHOD FOR AI-BASED ADAPTIVE SECURITY PARAMETER CALCULATION IN LICENSE KEY GENERATION WITH QUANTUM-RESISTANT PROTECTIONS

(71) Applicant: BANK OF AMERICA CORPORATION, Charlotte, NC (US)

(72) Inventors: Pushkar Taneja, Telangana (IN); Durga Prasad Kutthumolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 113 days.

(21) Appl. No.: 18/405,577

(22) Filed: Jan. 5, 2024

(65) Prior Publication Data
US 2025/0226977 A1    Jul. 10, 2025

(51) Int. Cl.
*H04L 9/08* (2006.01)
*H04L 9/06* (2006.01)
*H04L 9/32* (2006.01)

(52) U.S. Cl.
CPC .......... *H04L 9/0861* (2013.01); *H04L 9/0643* (2013.01); *H04L 9/0656* (2013.01); *H04L 9/3252* (2013.01)

(58) Field of Classification Search
CPC .................................................. H04L 9/0861
See application file for complete search history.

(56) References Cited

U.S. PATENT DOCUMENTS

| | | | |
|---|---|---|---|
| 7,051,212 B2 * | 5/2006 | Ginter | G06Q 20/14 380/231 |
| 8,705,740 B2 | 4/2014 | Ghouti | |
| 9,849,364 B2 | 12/2017 | Tran | |
| 10,708,046 B1 | 7/2020 | Ashrafi | |
| 10,735,205 B1 | 8/2020 | Wentz | |
| 10,742,421 B1 | 8/2020 | Wentz | |
| 10,764,058 B2 | 9/2020 | Macieira | |
| 11,108,560 B2 | 8/2021 | Dequen | |
| 11,196,550 B2 | 12/2021 | Yuan | |
| 11,409,865 B1 | 8/2022 | Kliger | |
| 11,580,321 B2 | 2/2023 | Wentz | |
| 2008/0019509 A1 | 1/2008 | Al-Gahtani | |
| 2010/0169658 A1 | 7/2010 | Ghouti | |

(Continued)

*Primary Examiner* — Simon P Kanaan
(74) *Attorney, Agent, or Firm* — Moore & Van Allen PLLC; Nicholas C. Russell

(57) ABSTRACT

Systems, computer program products, and methods are described herein for AI-based adaptive security parameter calculation in license key generation with quantum-resistant protections. The present disclosure is configured to utilize advanced cryptographic techniques, including elliptic curve cryptography and SHA-3 hashing, to produce secure digital signatures for license keys. An AI-driven engine analyzes historical security data to adaptively adjust key generation parameters, ensuring enhanced protection against current and emerging threats. This adaptive approach allows for continuous learning and improvement of security measures, making the system robust against both classical and quantum cryptographic attacks. The disclosed methods integrate the generation, assessment, and validation of keys into a streamlined process that promotes high security while maintaining efficiency.

20 Claims, 7 Drawing Sheets

(56) References Cited

U.S. PATENT DOCUMENTS

| | | |
|---|---|---|
| 2011/0202773 A1 | 8/2011 | Ghouti |
| 2019/0190726 A1 | 6/2019 | Wallrabenstein |
| 2021/0243020 A1 | 8/2021 | Mukherjee |
| 2021/0256070 A1 | 8/2021 | Tran |
| 2022/0029803 A1* | 1/2022 | Vijayanarayanan ...... H04L 9/32 |
| 2022/0040557 A1 | 2/2022 | Tran |
| 2022/0200787 A1 | 6/2022 | Kostman |
| 2022/0292203 A1 | 9/2022 | Severns-Williams |
| 2023/0027329 A1 | 1/2023 | Durham |
| 2023/0370258 A1 | 11/2023 | Armleder |

* cited by examiner

| Report | | | | | | | |
|---|---|---|---|---|---|---|---|
| | | | | Score 1-5 (1 is Low 5 is High) | High/Medium/Low | Stable/Unstable | Yes/No | NOT FOUND/Partial Found/Found |
| New License Key = Myd3ca3daa149e274db139855 1a9b9ad47 | | | | | | | |
| Product | License Key | Activation Date | Expiration Date | Status | Complexity Score | Security Level | is Secured | Current Trend | Yes | History |
| Product XYZ | NA | NA | NA | NA | 5 | High | Stable | Yes | NOT FOUND |
| Reject - Partial Match found with historical data | | | | | | | |
| New License Key = Myd3ca3daa149e274db139855 1a9b9ad47 | | | | | | | |
| Product | License Key | Activation Date | Expiration Date | Status | Complexity Score | Security Level | is Secured | Current Trend | History |
| Product XYZ | D3ca3daa149e274db139855 1a9b9ad47 | [Date] | [Date] | Active | 3 | Low | Stable | No | Partial Found |
| Reject - Partial Match found with historical data | | | | | | | |
| New License Key = Myd3ca3daa149e274db139855 1a9b9ad47 | | | | | | | |
| Product | License Key | Activation Date | Expiration Date | Status | Complexity Score | Security Level | is Secured | Current Trend | History |
| Product XYZ | 1a2b274db139855 1a9b9ad47 | [Date] | [Date] | Expired | 2 | Medium | No | No | Partial Found |
| Reject - Partial Match found with historical data | | | | | | | |
| New License Key = Myd3ca3daa149e274db139855 1a9b9ad47 | | | | | | | |
| Product | License Key | Activation Date | Expiration Date | Status | Complexity Score | Security Level | is Secured | Current Trend | History |
| Product XYZ | Myd3ca3daa149e274db139855 1a9b9ad47 | [Date] | [Date] | Active | 1 | low | No | No | FOUND |

SYSTEM AND METHOD FOR AI-BASED ADAPTIVE SECURITY PARAMETER CALCULATION IN LICENSE KEY GENERATION WITH QUANTUM-RESISTANT PROTECTIONS

TECHNOLOGICAL FIELD

Example embodiments of the present disclosure relate to AI-based adaptive security parameter calculation in license key generation.

BACKGROUND

The technological landscape surrounding this invention is anchored in the fields of cryptography and data security, particularly in the context of license key generation and deception prevention. Cryptography, the practice of secure communication in the presence of third parties, has evolved significantly over the years. Modern cryptography heavily relies on mathematical theories and computer science principles, enabling the encryption and decryption of data, secure communications, and data integrity. The creation and distribution of license keys are a critical component of software security, ensuring that only authorized users can access and use the software.

Artificial intelligence (AI) and machine learning s(ML) have transformed the way security systems analyze and respond to issues. AI and ML models are adept at processing large volumes of data, recognizing patterns, and predicting potential security breaches based on historical data. This capability is particularly relevant in detecting and preventing license key deception, which has become more sophisticated with the proliferation of digital technology. The integration of AI/ML in cybersecurity represents a shift from reactive to proactive security measures, allowing for the anticipation of deception patterns and the identification of anomalies in key generation and usage.

Applicant has identified a number of deficiencies and problems associated with AI-based adaptive security parameter calculation in license key generation. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for AI-based adaptive security parameter calculation in license key generation. This invention introduces an advanced method for generating secure license keys, combining user input with an AI-driven historical data analysis. At its core, the system employs a trained AI model to scrutinize previous license key generation patterns, enabling it to predict and enhance the security parameters of future keys. This AI model processes data and yields predictions about potential security issues, incorporating a sophisticated understanding of historical trends in license key deceptions and their associated patterns.

The technical process begins with the hashing of user input using a secure hash-based message, specifically incorporating elliptic curve digital signatures. This approach ensures robust protection against data misappropriation and unauthorized access. The innovation here lies in the combination of this hashed input with the AI model's output, culminating in the creation of a unique and secure license key. The invention also adopts the new SHA-3 family of hash functions, which are designed to withstand threats posed by quantum computing. By increasing the hash function output size, the system further fortifies itself against quantum attacks, as longer hash values significantly complicate the task of finding collisions or pre-images for a potential attacker.

This invention addresses the critical issue of license key deception, which encompasses the unauthorized sale and use of fake, misappropriated, or illegitimately generated keys. Such actions pose serious issues to both individuals and businesses, compromising software integrity and leading to financial and reputational damages. The proposed solution not only promises enhanced security against traditional forms of tampering and forgery but also positions itself as a forward-thinking tool capable of providing post-quantum security. By analyzing historical data on key generation patterns, geographical trends, and specific methodologies, this technology not only enhances the security of license keys but also contributes valuable insights into the evolving landscape of digital security.

Embodiments of the invention relate to systems, methods, and computer program products for AI-based adaptive security parameter calculation in license key generation with quantum-resistant protections, the invention including: generating a random key via a cryptographically secure pseudorandom number generator; hashing the random key utilizing a Secure Hash Algorithm 3 (SHA-3) family hash function to generate a hashed key; signing the hashed key with an elliptic curve digital signature to generate a hashed and signed key; analyzing historical data of key vulnerabilities and usage patterns using an artificial intelligence (AI) model; assigning a security score to the hashed and signed key based on the analysis performed by the AI model; generate a security report for the hashed and signed key comprising the security score, the results of the AI model's analysis, and a comparison with historical data; and validating security of the hashed and signed key against predefined security criteria and transmitting the hashed and signed key for use by one or more systems if validation is successful.

In some embodiments, the system is further configured to regenerate the hashed and signed key in real-time based on a security assessment score determined by the AI module.

In some embodiments, the system is further configured to seed the pseudorandom number generator based on entropy collected from an operating environment.

In some embodiments, the elliptic curve digital signature is generated using a deterministic algorithm.

In some embodiments, the AI model is further configured to perform machine learning techniques to predict potential vulnerabilities in generated keys.

In some embodiments, the security report comprises a timestamp of key generation, a list of potential vulnerabilities identified by the AI model, and recommendations for key regeneration intervals.

In some embodiments, validating the security of the hashed and signed key further comprises simulating attack scenarios, including rainbow table attacks and brute force attacks, to assess key resilience.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
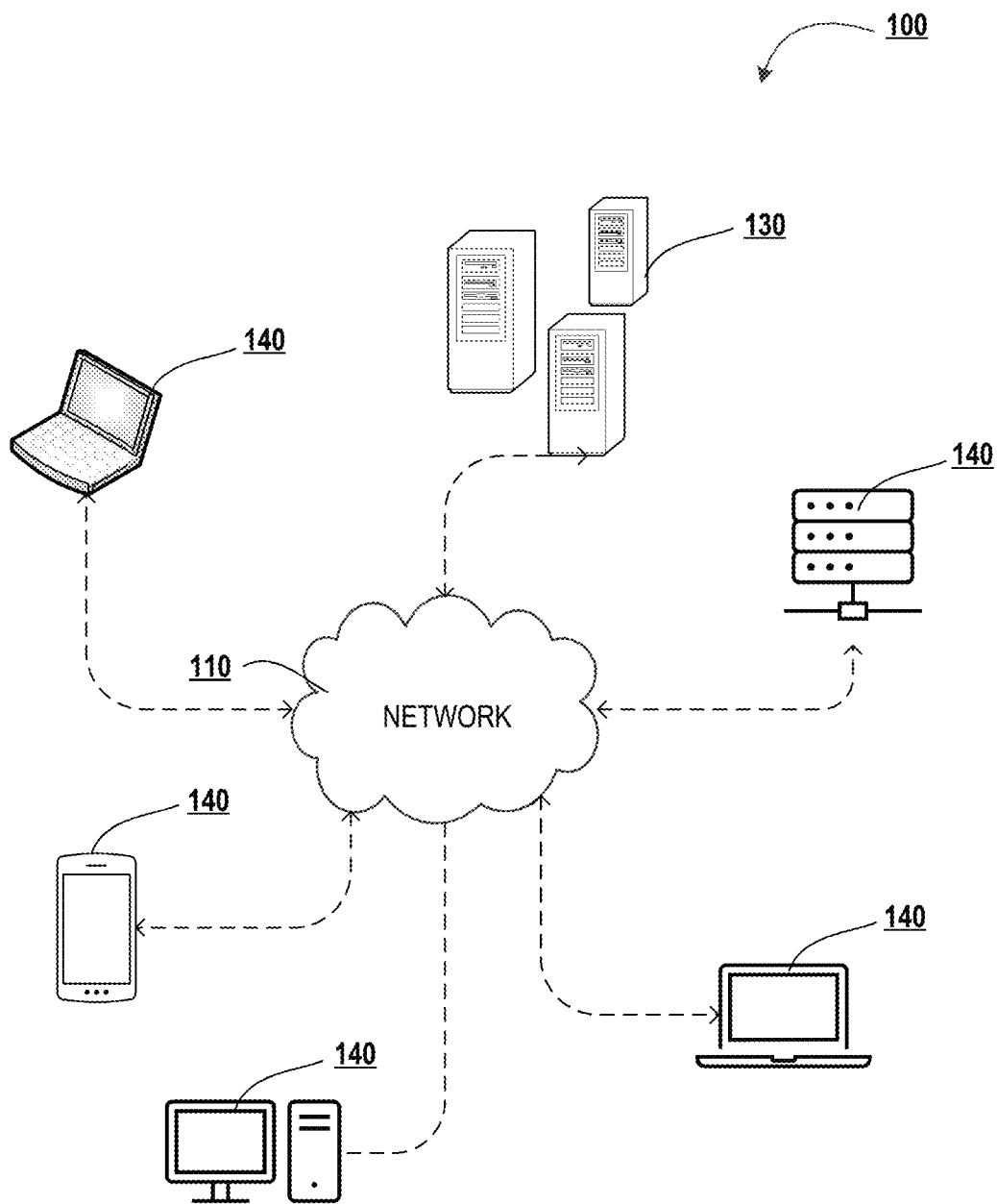
Figure 1B:
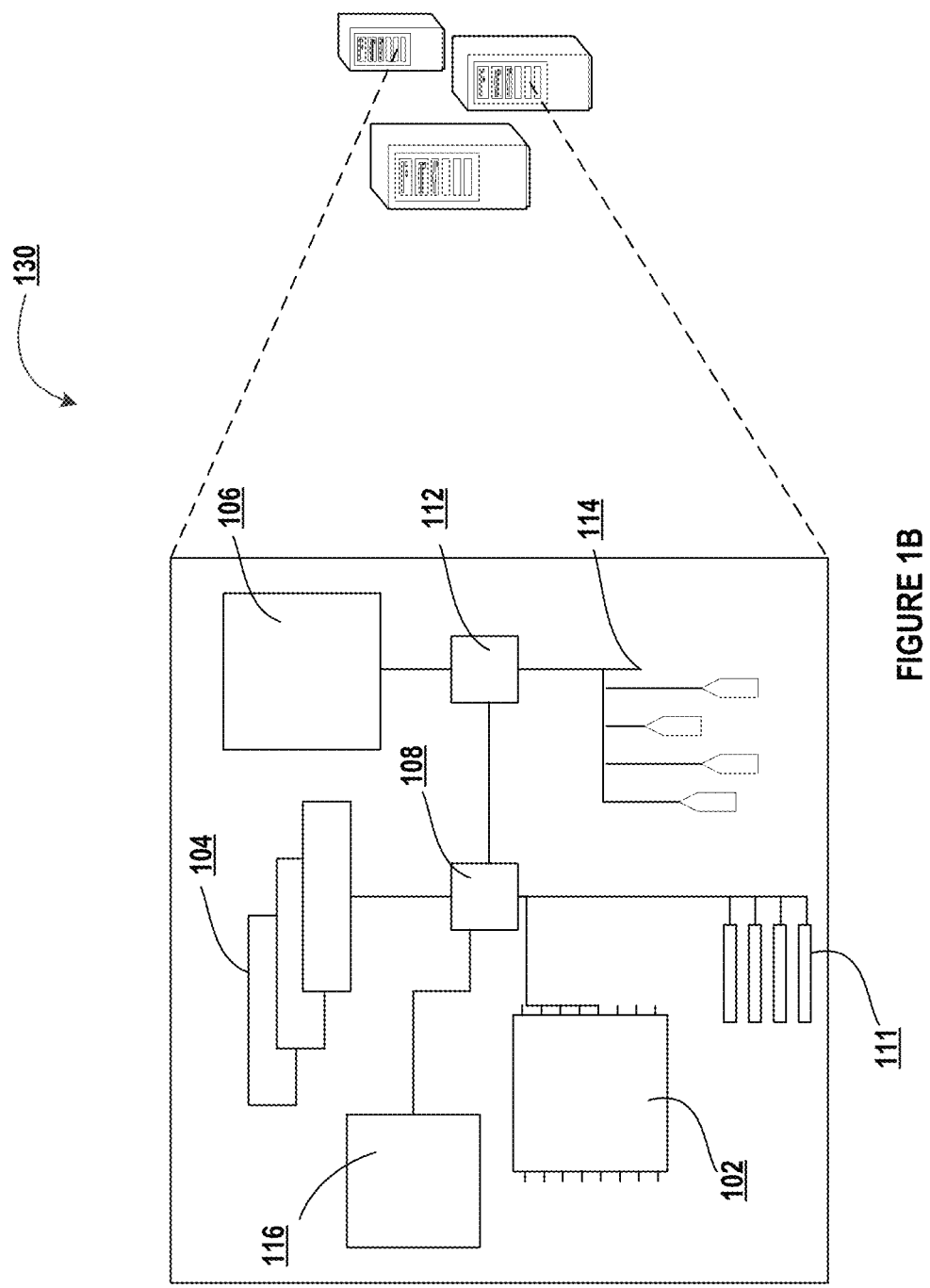
Figure 1C:
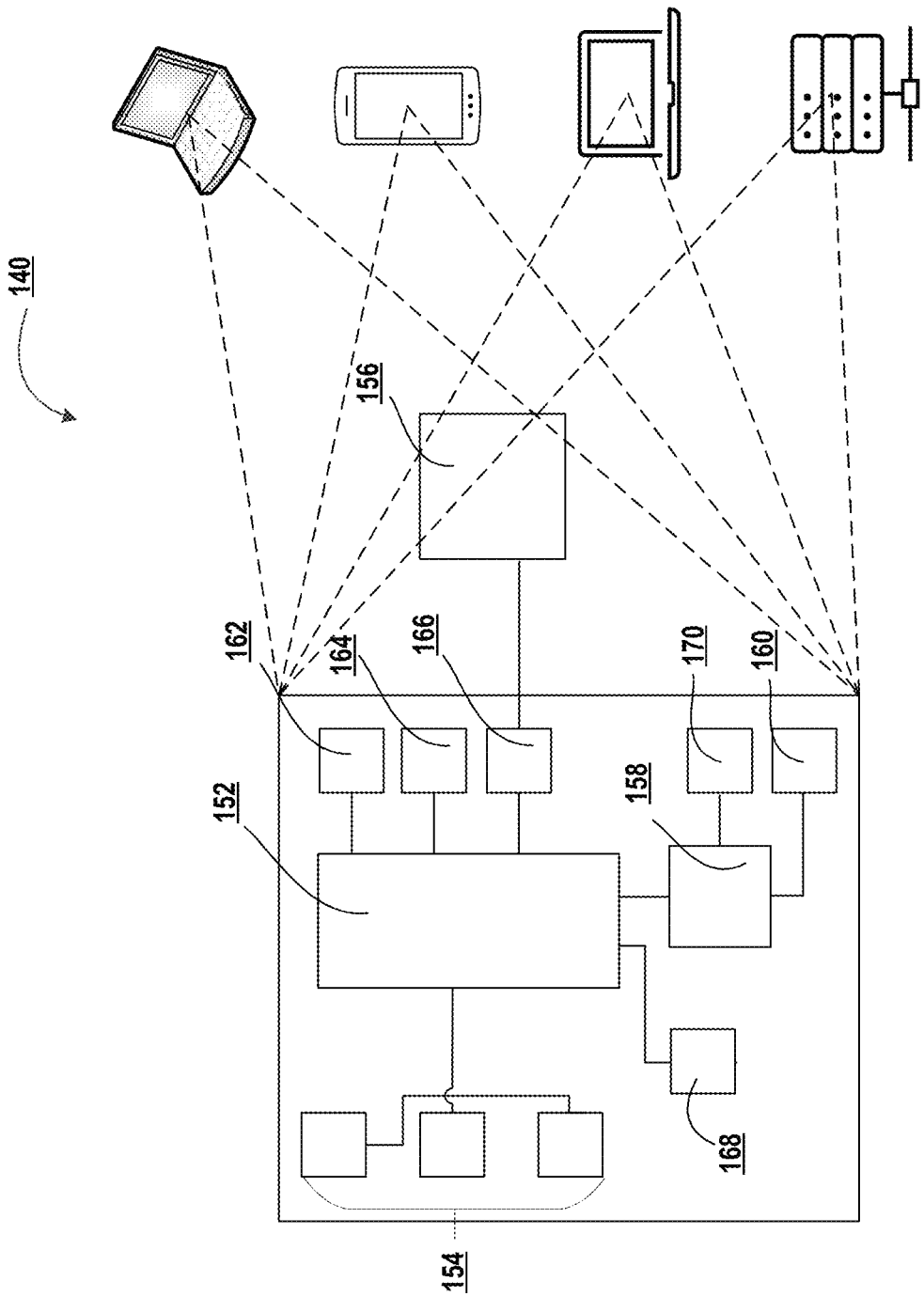
Figure 2:
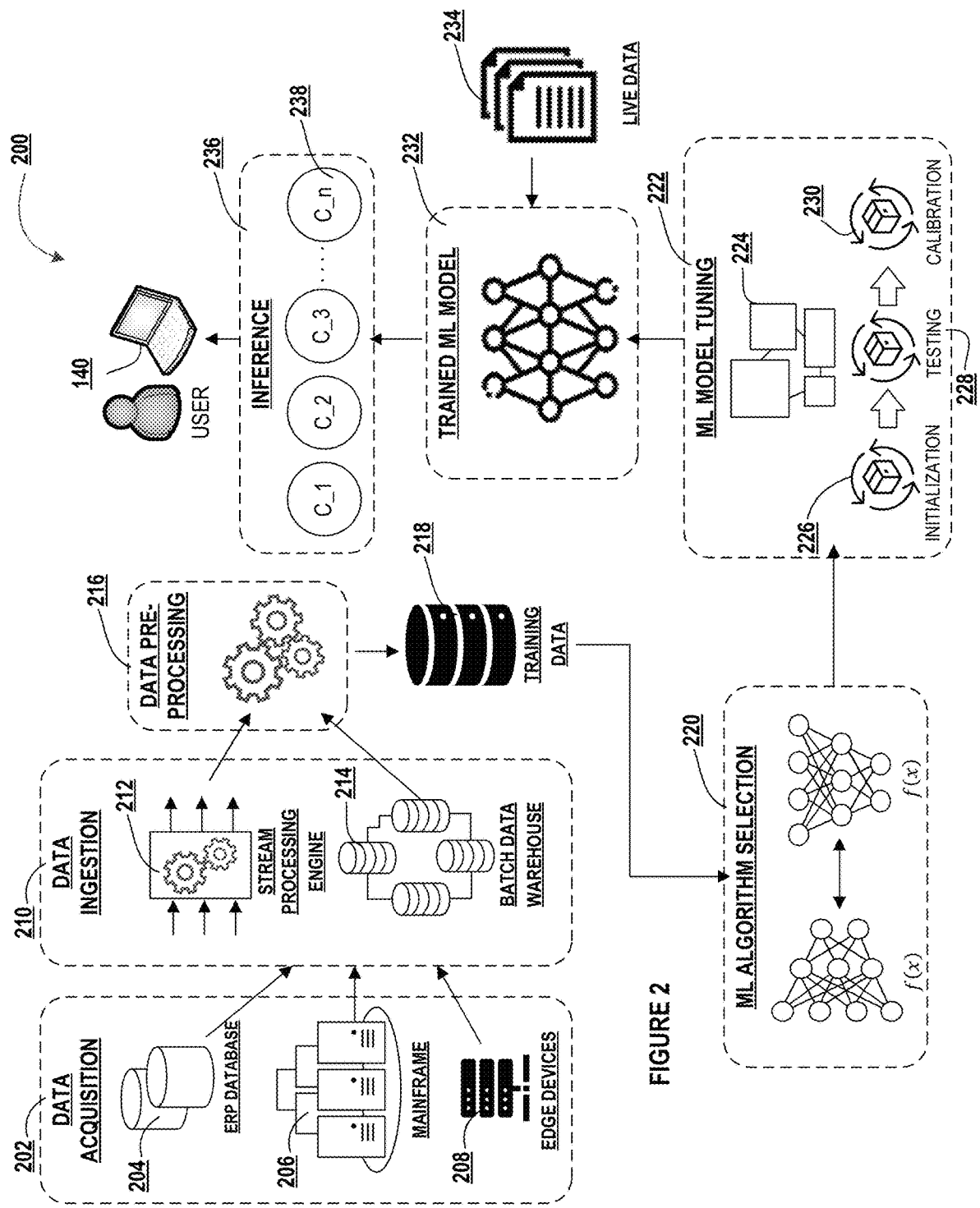
Figure 3:
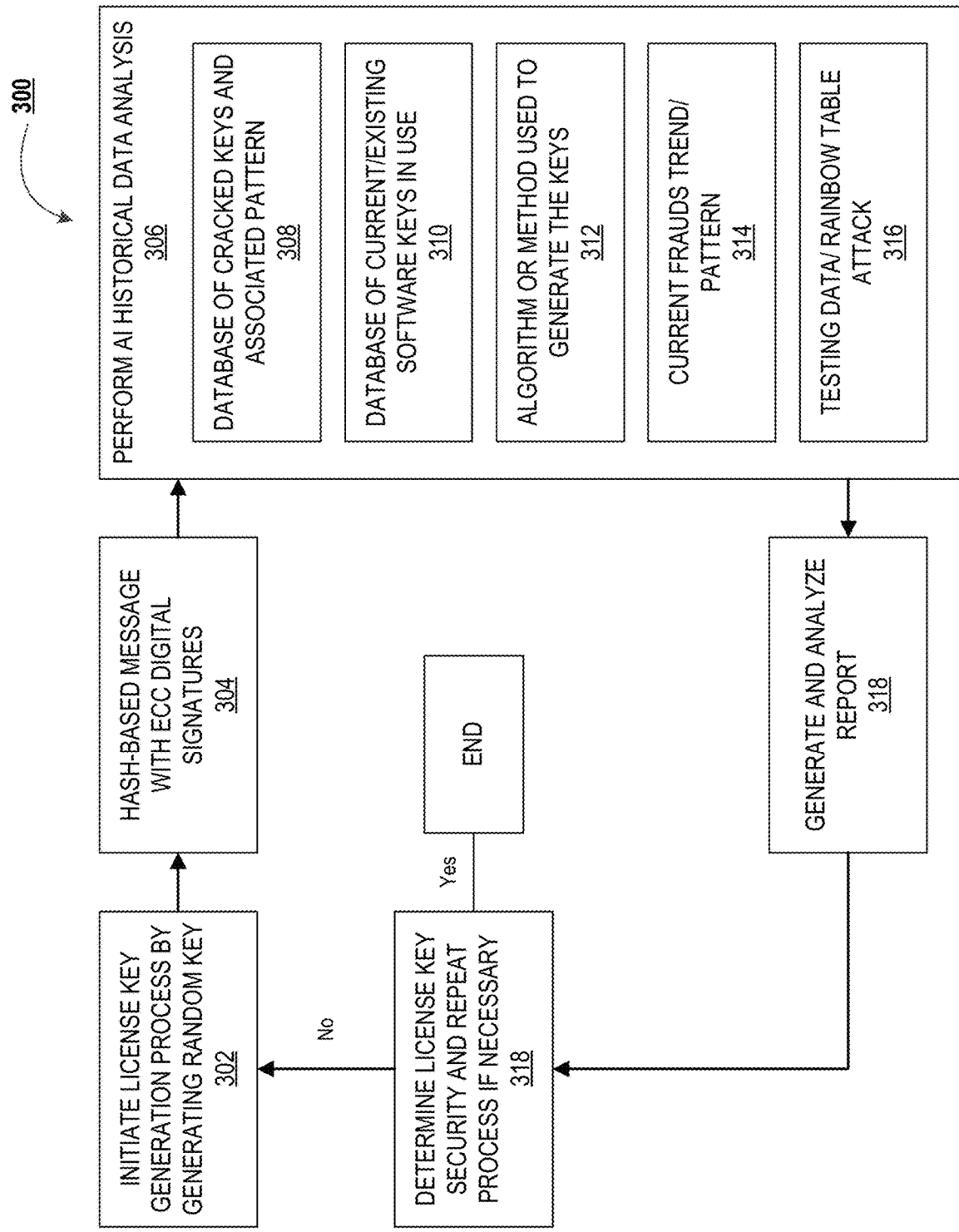
Figure 5:
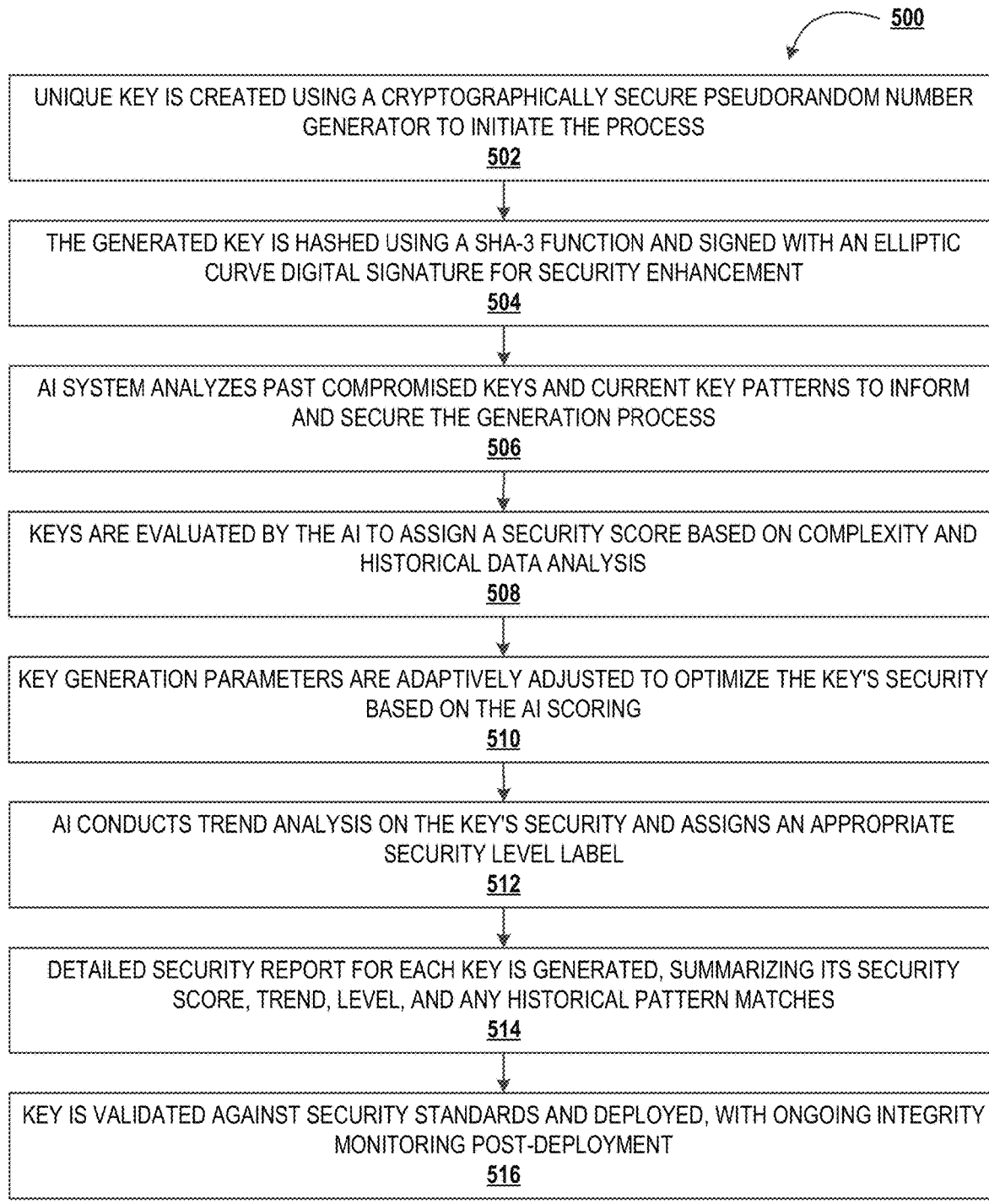

FIGS. 1A-1C illustrates technical components of an exemplary distributed computing environment 100 for AI-based adaptive security parameter calculation in license key generation with quantum-resistant protections, in accordance with an embodiment of the disclosure;

FIG. 2 illustrates an exemplary machine learning (ML) subsystem architecture 200, in accordance with an embodiment of the invention;

FIG. 3 illustrates an architecture flow 300 for AI-based adaptive security parameter calculation in license key generation with quantum-resistant protections, in accordance with an embodiment of the disclosure;

FIG. 4 illustrates a sample report and analysis for AI-based adaptive security parameter calculation in license key generation with quantum-resistant protections, in accordance with an embodiment of the disclosure; and FIG. 5 illustrates a process flow 500 for AI-based adaptive security parameter calculation in license key generation with quantum-resistant protections, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored and retrieved electronically using a computing device.

As used herein, "artificial intelligence" (AI) may generally refer to the simulation of human intelligence processes by machines, especially computer systems. These processes include the acquisition of information and rules for using the data, reasoning (using rules to reach approximate or definite conclusions), and self-correction. Particular applications of AI include expert systems, natural language processing (NLP), speech recognition, and machine vision. AI systems may function by processing large amounts of data and recognizing patterns in the data using algorithms and statistical models. Some example implementations herein contemplate AI being used in various sectors, assisting in tasks ranging from data analysis to automated decision-making. In some example implementations, AI may be integrated into devices, software, or platforms to enhance their functionality, make them more intelligent, or enable them to perform tasks autonomously. For purposes of this disclosure, AI typically operates on data stored in a digital repository, a storage location where data is organized, stored, and retrieved electronically using a computing device. The use of AI in this context may involve interactions with a variety of data types, including structured, unstructured, and semi-structured data.

As used herein, "machine learning" (ML) refers to a subset of artificial intelligence (AI) that involves the development of algorithms and statistical models that enable computers to perform a specific task without using explicit instructions, relying instead on patterns and inference. ML focuses on the use of data and algorithms to imitate the way humans learn, gradually improving its accuracy. ML systems operate by building a model based on sample data, known as "training data", to make predictions or decisions without being explicitly programmed to perform the task. These systems are designed to learn and adapt when exposed to new data, enhancing their decision-making or predictive capabilities over time. ML can be employed to analyze financial transactions to identify unusual patterns that may indicate deceptive activity, or it can be used in customer service applications to predict customer preferences and provide personalized recommendations. In some example implementations, ML may be integrated into a broader system, such as a data analytics platform or an autonomous control system, to process data, recognize patterns, and make informed decisions. ML algorithms can range from simple linear regression models to complex deep learning networks, depending on the nature and complexity of the task.

As used herein, a "hash value" refers to the output produced by a hash function. A hash function is a type of algorithm that takes an input (or 'message') and returns a fixed-size string of bytes. The output, the hash value, typically appears as a seemingly random sequence of letters and numbers. The primary characteristic of a hash function is that it is computationally infeasible to reverse the operation, meaning it is difficult to generate the original input given only the hash value. Hash values are commonly used in various aspects of computer security and data integrity. Example implementations herein include using hash values for verifying the integrity of data, securing passwords, or creating digital signatures. For instance, in a cybersecurity context, hash values may be used to ensure that a transmitted message has not been altered or tampered with. This is achieved by comparing the hash value of the received message with the expected hash value. For purposes of this disclosure, the computation of a hash value typically involves processing data through a hash function using a computing device. The hash function is designed to be a one-way function, ensuring that the hash value does not reveal any significant information about the original data.

As used herein, a "private key" refers to a variable in cryptography that is used with an algorithm to encrypt and decrypt data. Private keys are part of an asymmetric encryption system, which uses a pair of keys—the private key and a corresponding public key. The private key is known only to the owner and is used to decrypt information encrypted with the public key or to digitally sign information, ensuring confidentiality and integrity. In various example implementations, private keys are used in processes such as securing communications, authenticating identity, and conducting secure transactions. For example, in digital signature technology, a private key is used to create a signature on a document, which can then be verified by others using the corresponding public key. For purposes of this disclosure, the management of a private key typically involves secure storage and handling practices, as the security of the private key is crucial for maintaining the security of the system it is part of. Private keys are often stored in protected digital formats or secure hardware modules to prevent unauthorized access and use.

As used herein, an "elliptic curve key pair" refers to a pair of cryptographic keys used in elliptic curve cryptography (ECC), a type of public-key cryptography based on the algebraic structure of elliptic curves over finite fields. An elliptic curve key pair consists of a private key and a corresponding public key, both of which are derived from a point on an elliptic curve. The private key in an elliptic curve key pair is a randomly selected number from a finite range. This key is kept secret and is used to generate signatures or to decrypt data that was encrypted with the corresponding public key. The public key is derived from the private key and a predefined point on the elliptic curve, known as the base point. The public key is calculated by multiplying the private key with the base point, resulting in another point on the curve. This key can be distributed openly and is used to encrypt data or to verify signatures made with the corresponding private key. Example implementations of elliptic curve key pairs include secure communication protocols, digital signature schemes, and encryption systems. For instance, they are often used in secure web communications (SSL/TLS), and in various secure messaging applications. Elliptic curve cryptography offers several advantages, including improved security with shorter key lengths compared to other cryptographic methods like RSA. This leads to faster computations, lower power consumption, and reduced storage and bandwidth requirements, making ECC particularly suitable for use in constrained environments like mobile devices and smart cards. For purposes of this disclosure, the generation, storage, and use of an elliptic curve key pair typically involve cryptographic algorithms and secure computing environments to maintain the confidentiality of the private key and the integrity of the public key.

The present invention introduces a technology in the realm of digital security, specifically in the generation and management of license keys. Utilizing a sophisticated combination of artificial intelligence and machine learning (AI/ML) models, along with advanced cryptographic techniques, this technology is poised to redefine the standards of license key security. The field of digital security is currently challenged by the rampant issues of license key deception and vulnerabilities. Traditional methods of generating license keys are often susceptible to hacking, duplication, and unauthorized usage. The complexity of these security threats is further compounded by the emerging issues posed by quantum computing, making existing key generation methods potentially obsolete and insecure.

An elliptic curve digital signature generated using a deterministic algorithm means that the process of creating the digital signature is repeatable and predictable, provided the same input is used. In cryptography, deterministic algorithms perform the same operations and produce the same output every time they are run with a particular input, as opposed to non-deterministic or randomized algorithms, which might produce different outputs for the same input due to the use of random numbers in the process. When referring to elliptic curve digital signatures, this typically involves using Elliptic Curve Cryptography (ECC) for signing data. ECC is a method of public-key cryptography based on the algebraic structure of elliptic curves over finite fields. A deterministic algorithm within ECC for signature generation means that the signature is unique to the private key and the message being signed but will always be the same for that particular combination of message and private key.

One widely known deterministic algorithm for ECC is the Digital Signature Algorithm (ECDSA). A deterministic version of this algorithm (deterministic ECDSA, or RFC 6979) eliminates the need for a random number in the signature generation process. Instead, it uses a fixed process to generate the randomness component of the signature from the private key and the hash of the message, ensuring that the same signature is produced every time for the same message and private key. This approach can improve security by removing the uncertainty and potential vulnerabilities associated with generating cryptographic randomness.

In simple terms, this invention is a highly intelligent and secure method of creating digital "keys" or codes that are used to access software or online services. Akin to making a unique key for every lock, where the lock is the software, and the key is what allows for use. This system is intelligent enough to learn from past key-making patterns to avoid making keys that can be easily copied or broken. Additionally, it uses special mathematical techniques to make these keys even more secure, especially against future threats from powerful quantum computers. Accordingly, the present disclosure reveals a cutting-edge approach to generating license keys. This approach leverages AI/ML to analyze historical data for predicting key security, uses hash-based methods with elliptic curve digital signatures for enhanced security, employs quantum-resistant SHA-3 family hash functions, and integrates various datasets for comprehensive security analysis. This multifaceted strategy not only fortifies the keys against current cyber threats but also prepares them for future challenges in digital security.

What is more, the present disclosure provides a technical solution to a technical problem. As described herein, the technical problem includes the vulnerability of license keys to deception, duplication, and quantum computing threats. The technical solution presented herein allows for the creation of highly secure and robust license keys, effectively addressing these challenges. In particular, this solution is an improvement over existing solutions to the license key security problem, (i) with AI/ML algorithms reducing the steps and computing resources needed for predicting key security, (ii) providing more accurate and tamper-proof keys, thus minimizing the resources required for rectifying security breaches, (iii) automating key generation and eliminating manual errors, thus enhancing the efficiency and speed of the process, (iv) optimizing resource usage for key generation, thereby reducing network traffic and load on computing systems. Furthermore, the technical solution described herein employs a rigorous, computerized process for key generation, a task that was previously less secure and more resource-intensive. In specific implementations, the technical solution bypasses several conventional steps, further conserving computing resources and enhancing overall system efficiency.

FIGS. 1A-1C illustrate technical components of an exemplary distributed computing environment 100 for AI-based adaptive security parameter calculation in license key generation with quantum-resistant protections, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates an architecture flow 300 for AI-based adaptive security parameter calculation in license key generation with quantum-resistant protections, in accordance with an embodiment of the disclosure. The operation of the AI-based adaptive security parameter calculation in license key generation with quantum-resistant protections, as illustrated in FIG. 3, commences with step 302, where the license key generation process is initiated by generating a random key. This random key serves as the preliminary basis for the subsequent steps in the secure key generation process. Expanding on step 302 from a technical coding and architecture perspective, the process of generating a random key involves several layers of complexity to ensure the unpredictability and security of the key. The initial step in the license key generation process is to create a random key that will form the basis for further security enhancements. This is achieved through a cryptographically secure pseudorandom number generator (CSPRNG), which is a key component of cryptographic algorithms that require high entropy, such as key generation algorithms.

One of ordinary skill in the art will recognize that the choice of CSPRNG is critical for the security of the system. These generators are designed to be unpredictable, ensuring that the output is not feasibly reproducible. In some embodiments, entropy may be gathered from various sources within the computing environment, such as mouse movements, keyboard timings, system clocks, and uninitialized memory. This randomness is used to seed the CSPRNG. The CSPRNG outputs a sequence of bits that are then formatted into a key structure. This could involve encoding the bits into alphanumeric characters or other schemes appropriate for the license key format. The software architecture surrounding the random key generation must support both the generation and the immediate secure handling of the key. In some embodiments, immediately after generation, the random key is stored in a secure, transient memory space. This ensures that the key is not written to a persistent storage medium where it might be at chance of unauthorized access or leakage. The key generation service is designed to be stateless, where possible, such that it retains no memory of generated keys after they have been handed off to the subsequent process. This design reduces the attack surface for any potential security breaches. The key generation service may be isolated from other services, running in a sandboxed or containerized environment to minimize the chance of cross-service attacks. In preferred embodiments, communication with other services may be done over secure, authenticated channels.

Proceeding to step 304, the initial random key undergoes a hash-based message authentication process coupled with Elliptic Curve Digital Signatures (ECC). This step ensures that the key is transformed into a format that is secure and resistant to unauthorized modifications, thus enhancing the integrity of the key.

The technical coding and architectural perspective of step 304 involves implementing a hash-based message authentication process coupled with Elliptic Curve Digital Signatures (ECC) to secure the initial random key. In preferred embodiments, SHA-3 family hash algorithm is chosen for its resistance to collision attacks and quantum computing threats. This algorithm is known for its cryptographic strength and speed of computation. The random key generated in step 302 is input into the hash function. The hash function processes the key and outputs a fixed-size hash value, which is unique to the original key. Any slight change in the input key results in a vastly different hash, thus ensuring sensitivity to input alterations. An appropriate elliptic curve is chosen from the recommended sets of curves that have been widely vetted for security, such as NIST P-256 or Curve25519. Using the selected curve, a private-public key pair is generated. The private key is securely stored and managed, while the public key can be shared or embedded in software systems where the generated license keys will be used.

The hash value from the hash function is digitally signed using the ECC private key. This creates a digital signature that is unique to both the key and the signing private key. A dedicated microservice may be initialized for handling the cryptographic signing process. This service receives the hash value, accesses the private key, performs the signing, and returns the digital signature. The private key used for ECC is managed through a secure key management system, which may involve hardware security modules (HSMs) or the like that protect against unauthorized access. Similar to the key generation service, the signing service is isolated to prevent potential vulnerabilities from affecting other system components. The implementation of the hash and ECC algorithms follows secure coding standards to prevent common vulnerabilities, such as buffer overflows or side-channel attacks. In some embodiments, established cryptographic libraries, such as OpenSSL or libsodium, may be used to implement hashing and ECC functionalities. The code undergoes rigorous security reviews and penetration testing to ensure that the cryptographic processes are implemented correctly and are free from vulnerabilities. All actions related to the generation of the digital signature are logged with an immutable audit trail for traceability and forensic analysis in the event of a security incident. By meticulously implementing the hash-based message authentication and ECC digital signatures as described, step 304 ensures that the initial random key is securely transformed into a format that provides assurance of integrity and non-repudiation, setting the stage for a secure and trustworthy license key generation system.

In step 306, the system performs AI historical data analysis. This analysis is a multi-faceted approach that utilizes various databases and tools to assess and predict the security level of the generated key. Specifically, the AI engine examines a database of cracked keys and associated patterns, as indicated in block 308, to learn from past vulnerabilities. Also involved in this analysis is a database of current/existing software keys in use, as shown in block 310, to avoid generating keys that could inadvertently mimic or interfere with existing keys. As shown in block 312, the system also accounts for the function or algorithm used to generate the keys in order to identify any inherent weaknesses or predictability within certain key generation methods. As shown in block 314, the system also accounts for known trends or patterns in malfeasant attacks to integrate the latest intelligence on security threats and adapt the key generation process accordingly. The system also references testing data, such as a rainbow table attack, to simulate potential attacks on the generated keys and assess their resistance to such threats, as indicated by block 316.

In step 306, the system employs a complex AI-driven historical data analysis mechanism to predict and enhance the security of the generated license key. It is understood that the system utilizes robust machine learning frameworks like TensorFlow, PyTorch, or the like, to construct predictive models capable of learning from historical data. These models are trained to recognize patterns that indicate security weaknesses or vulnerabilities in license keys. The raw data from various databases undergoes preprocessing to transform it into a format suitable for machine learning. This involves normalization, feature extraction, and, in some embodiments, dimensionality reduction to make the training process more efficient. The system ingests data from a database of previously cracked keys, analyzing the patterns and common characteristics of these compromised keys. This involves parsing key structures, assessing usage contexts, and identifying security flaws that were at issue in past cases.

A comparison is performed against a database of active keys to ensure the newly generated key does not collide or share significant similarities with existing keys, which could introduce security issues or operational conflicts. The AI engine reviews the functions and algorithms historically used to generate keys, applying statistical analysis and anomaly detection techniques to spot patterns of weaknesses or predictability that could be targeted by attackers. By analyzing current and historical trends in security breaches, including common attack vectors and methods, the system updates its predictive models to anticipate and mitigate similar threats against newly generated keys.

The system employs rainbow tables or equivalent datasets to test the resilience of generated keys against brute force attacks. This simulation helps in assessing the potential for a key to be compromised using known attack methodologies. A "rainbow table" is a data structure that's used to speed up the process of finding out what original text, such as a license key, produced a specific hashed output. As such, a rainbow table is a precomputed table for reversing cryptographic hash functions, primarily used for cracking license key hashes. It is an optimization of a more straightforward technique of using precomputed dictionaries of hashed values which map back to their plaintexts. A rainbow table is built by choosing a list of plaintexts, running them through a hash function, and storing the plaintext along with its hash value in a table. To save space, rainbow tables use a technique called "chain reduction." Instead of storing every possible hash and its corresponding plaintext, they create chains of alternating hashed and reduced values, where a reduction function converts a hash into another plaintext in a deterministic way. When attempting to crack a hash, the hash value is reduced and searched for within the table. If it's not found, the process is repeated with subsequent hash-reduce pairs until a match is found within the table. Once a match is found in the table, the chain is "traversed" from the beginning, applying the hash and reduction functions repeatedly until the original hash value is found. The corresponding plaintext at this point in the chain is the sought-after license key.

A data pipeline is constructed to automate the flow of information from the databases to the AI engine. This includes real-time data streaming, batch processing, and a scheduling system for regular updates and retraining of models. The AI models are trained using historical data sets with known outcomes. Cross-validation techniques are used to ensure that the models generalize well to new, unseen data and are not overfitting to the training data. The system is architected as a series of microservices, each handling a specific aspect of the AI analysis process. This modular approach allows for scalable, maintainable, and more secure operations.

It is understood that all components adhere to industry-standard security protocols, such as using TLS for data in transit and encryption for data at rest. Compliance with data protection regulations is maintained throughout the process. The system follows a CI/CD approach for the AI models and data pipeline, allowing for rapid updates and iterative improvements based on the latest data and security research findings. It is understood that CI/CD stands for Continuous Integration/Continuous Deployment or Continuous Delivery. This is a method of frequently delivering apps to customers by introducing automation into the stages of app development. The main concepts attributed to CI/CD are continuous integration, continuous deployment, and continuous delivery. In preferred embodiments, automated testing frameworks are in place to validate the integrity and performance of the AI engine, including unit tests, integration tests, and security-specific tests. The system includes comprehensive monitoring and alerting capabilities to track the performance of the AI analysis and to quickly identify and respond to any anomalies or issues.

Upon completing the historical data analysis, the system returns to step 318 to determine the security of the generated license key. If the key is deemed secure, the process concludes. However, if the security assessment reveals vulnerabilities, the process is repeated, iterating through steps 302 to 318 as necessary, until a key with satisfactory security parameters is generated. Furthermore, in step 318, the invention generates and analyzes a report which encapsulates the security assessment and predictive analysis conducted by the AI, as further outlined with regard to FIG. 4 and its accompanying discussion. This report informs the decision on whether the generated key is secure or if there is a need to repeat the process. Through this rigorous, iterative process, the invention ensures that the final generated license key is not only unique but also possesses robust security, resistant to the most recent and sophisticated methods of attacks, including those that leverage quantum computing capabilities.

FIG. 4 illustrates a sample report and analysis for AI-based adaptive security parameter calculation in license key generation with quantum-resistant protections, in accordance with an embodiment of the disclosure. FIG. 4 provides a visual representation 400 of a sample report generated as part of the AI-based adaptive security parameter calculation system designed for the creation of quantum-resistant license keys, according to an embodiment of the disclosure. The report is a comprehensive overview of the security parameters and the status of various license keys generated by the system.

The first section of the report under the heading "New License Key" details individual entries of generated license keys, including a unique identifier for each key, associated product information, and relevant activation and expiration dates. Each entry is assessed by the AI system across multiple security dimensions, such as a complexity score ranging from 1 to 5, with 1 indicating low complexity and 5 indicating high complexity, along with a corresponding security level classification of High, Medium, or Low.

In the subsequent columns, the report provides further insights into the operational status of the license keys, indicating whether each key is active or expired and presenting a trend analysis to identify if the security status is stable or unstable. The column "Is Secured" denotes a binary assessment of the key's security, and the "History" column indicates whether there is a historical precedent for the key pattern, ranging from 'Not Found' for unique keys to 'Partial Found' or 'Found' for keys with recognizable patterns.

The report serves as a critical tool for system administrators to quickly gauge the robustness of license keys against potential security threats, including those posed by quantum computing capabilities. It allows for immediate visual identification of potentially compromised keys or keys that require further investigation due to their partial match with historical data. This AI-driven approach ensures a proactive stance in license key management and security, adapting to evolving threats by learning from past data and trends.

FIG. 5 illustrates a process flow 500 for AI-based adaptive security parameter calculation in license key generation with quantum-resistant protections, in accordance with an embodiment of the disclosure. The process begins at step 502 with the initiation of the license key generation. A random key is generated using a cryptographically secure pseudorandom number generator (CSPRNG). This random key serves as the foundation upon which additional layers of security are to be built, ensuring that each key is unique and unpredictable right from the outset. Following the initial generation, as shown in step 504, the random key is hashed using a secure hash function from the SHA-3 family, known for its quantum resistance. The hashed key is then signed with an elliptic curve digital signature algorithm (ECDSA), providing a layer of cryptographic security that authenticates the source of the key and ensures that it has not been altered in transit.

As indicated in step 506, the AI-based system conducts historical data analyses. The AI system examines databases of previously cracked keys, current keys in use, and known patterns of key generation that have been utilized. This step is crucial in understanding and learning from historical vulnerabilities to avoid repeating them. Utilizing the AI model's predictive capabilities, each newly generated key is given a security assessment score, as indicated by step 508. This score is based on the complexity of the key and the historical analysis of past keys' robustness. The score ranges from 1 (low complexity and thus lower security) to 5 (high complexity and enhanced security).

In step 510, the AI system then adapts the security parameters of the key generation process based on the security assessment score. If a key scores low in complexity and security, the system automatically adjusts its parameters to increase the key complexity and, consequently, security level. Step 512 includes a trend analysis is conducted to monitor the stability of the key's security over time. This step ensures that the security measures in place remain effective against emerging threats. The key is then assigned a security level label (e.g., High, Medium, or Low, or the like), reflecting resilience against potential attacks. As indicated in step 514, the system generates a comprehensive security report for each key, documenting the security assessment score, trend analysis, security level, and whether any historical patterns match those of compromised keys. This report is integral for administrators to review the overall security of the generated keys.

In the final step 516, the key undergoes a validation process to ensure it meets the security standards set forth by the system. Once validated, the key is deployed for use. The system continuously monitors the key's integrity post-deployment, ready to initiate the regeneration process if any security compromise is detected. This end-to-end process flow ensures that each license key generated by the invention not only begins with a strong, random foundation but is also refined through AI-driven analysis and adjustments, resulting in a robust, quantum-resistant product.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for adaptive security parameter calculation, the system comprising:
    a processing device;
    a non-transitory storage device containing instructions when executed by the processing device, causes the processing device to perform the steps of:
        generating a random key via a cryptographically secure pseudorandom number generator;
        hashing the random key utilizing a Secure Hash Algorithm 3 (SHA-3) family hash function to generate a hashed key;
        signing the hashed key with an elliptic curve digital signature to generate a hashed and signed key, wherein the elliptic curve parameters are selected based on predetermined security criteria;
        analyzing historical data of key vulnerabilities and usage patterns using an artificial intelligence (AI) model;
        assigning a security score to the hashed and signed key based on the analysis performed by the AI model, wherein the score is calculated using a quantifiable metric system ranking complexity and unpredictability of the hashed and signed key;
        generating a security report for the hashed and signed key comprising the security score, the results of the AI model's analysis, and a comparison with historical data;
        validating security of the hashed and signed key against predefined security criteria; and
        transmitting the hashed and signed key for use by one or more specified systems, wherein transmission is secured using an encryption protocol.

2. The system of claim 1, wherein the system is further configured to regenerate the hashed and signed key in real-time based on a security assessment score determined by the AI module.

3. The system of claim 1, wherein the system is further configured to seed the pseudorandom number generator based on entropy collected from an operating environment.

4. The system of claim 1, wherein the elliptic curve digital signature is generated using a deterministic algorithm.

5. The system of claim 1, wherein the AI model is further configured to perform machine learning techniques to predict potential vulnerabilities in generated keys.

6. The system of claim 1, wherein the security report comprises a timestamp of key generation, a list of potential vulnerabilities identified by the AI model, and recommendations for key regeneration intervals.

7. The system of claim 1, wherein validating the security of the hashed and signed key further comprises simulating attack scenarios, including rainbow table attacks and brute force attacks, to assess key resilience.

8. A computer program product for adaptive security parameter calculation, the computer program product comprising a non-transitory computer-readable medium comprising code causing an apparatus to:
    generate a random key via a cryptographically secure pseudorandom number generator;
    hash the random key utilizing a Secure Hash Algorithm 3 (SHA-3) family hash function to generate a hashed key;
    sign the hashed key with an elliptic curve digital signature to generate a hashed and signed key, wherein the elliptic curve parameters are selected based on predetermined security criteria;
    analyze historical data of key vulnerabilities and usage patterns using an artificial intelligence (AI) model;
    assign a security score to the hashed and signed key based on the analysis performed by the AI model, wherein the score is calculated using a quantifiable metric system ranking complexity and unpredictability of the hashed and signed key;
    generate a security report for the hashed and signed key comprising the security score, the results of the AI model's analysis, and a comparison with historical data;
    validate security of the hashed and signed key against predefined security criteria; and
    transmit the hashed and signed key for use by one or more specified systems, wherein transmission is secured using an encryption protocol.

9. The computer program product of claim 8, wherein the code further causes the apparatus to regenerate the hashed and signed key in real-time based on a security assessment score determined by the AI module.

10. The computer program product of claim 8, wherein the code further causes the apparatus to: seed the pseudorandom number generator based on entropy collected from an operating environment.

11. The computer program product of claim 8, wherein the elliptic curve digital signature is generated using a deterministic algorithm.

12. The computer program product of claim 8, wherein the AI model is further configured to perform machine learning techniques to predict potential vulnerabilities in generated keys.

13. The computer program product of claim 8, wherein the security report comprises a timestamp of key generation, a list of potential vulnerabilities identified by the AI model, and recommendations for key regeneration intervals.

14. The computer program product of claim 8, wherein validating the security of the hashed and signed key further comprises simulating attack scenarios, including rainbow table attacks and brute force attacks, to assess key resilience.

15. A method for adaptive security parameter calculation, the method comprising:
  generating a random key via a cryptographically secure pseudorandom number generator;
  hashing the random key utilizing a Secure Hash Algorithm 3 (SHA-3) family hash function to generate a hashed key;
  signing the hashed key with an elliptic curve digital signature to generate a hashed and signed key, wherein the elliptic curve parameters are selected based on predetermined security criteria;
  analyzing historical data of key vulnerabilities and usage patterns using an artificial intelligence (AI) model;
  assigning a security score to the hashed and signed key based on the analysis performed by the AI model, wherein the score is calculated using a quantifiable metric system ranking complexity and unpredictability of the hashed and signed key;
  generating a security report for the hashed and signed key comprising the security score, the results of the AI model's analysis, and a comparison with historical data;
  validating security of the hashed and signed key against predefined security criteria; and
  transmitting the hashed and signed key for use by one or more specified systems, wherein transmission is secured using an encryption protocol.

16. The method of claim 15, wherein the method further comprises regenerating the hashed and signed key in real-time based on a security assessment score determined by the AI module.

17. The method of claim 15, wherein the method further comprises seeding the pseudorandom number generator based on entropy collected from an operating environment.

18. The method of claim 15, wherein the elliptic curve digital signature is generated using a deterministic algorithm.

19. The method of claim 15, wherein the security report comprises a timestamp of key generation, a list of potential vulnerabilities identified by the AI model, and recommendations for key regeneration intervals.

20. The method of claim 15, wherein validating the security of the hashed and signed key further comprises simulating attack scenarios, including rainbow table attacks and brute force attacks, to assess key resilience.

* * * * *